Theodore J. McGowan.
Assignor to
McGowan Bros. Pump & Mach. Co.
Imp't in Crank Gearing.
117312                      Patented Jul 25 1871
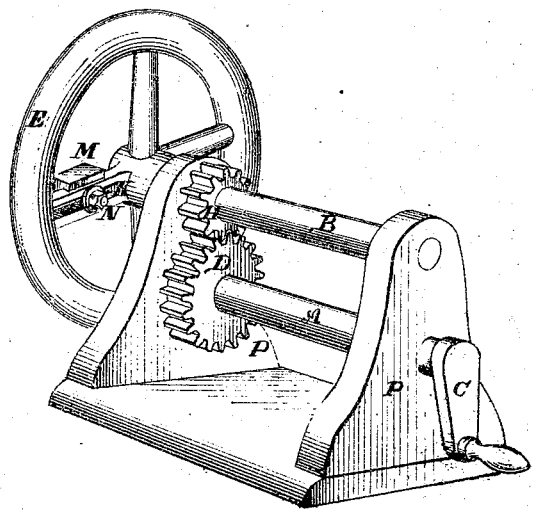
Attest.
O. M. Shurry.
C. G. Hale
Inventor.
Theodore J. McGowan

UNITED STATES PATENT OFFICE.

THEODORE J. McGOWAN, OF CINCINNATI, OHIO, ASSIGNOR TO McGOWAN BROTHERS PUMP AND MACHINE COMPANY, OF SAME PLACE.

IMPROVEMENT IN CRANK-GEARINGS.

Specification forming part of Letters Patent No. 117,312, dated July 25, 1871.

*To all whom it may concern:*

Be it known that I, THEODORE J. McGOWAN, of the city of Cincinnati, in the county of Hamilton and State of Ohio, have invented a certain new and useful Improvement in Crank-Gearing, of which the following is a specification:

My invention relates to the introduction of intermediate gear between the crank-shaft and the balance-wheel shaft of a donkey, pump, or other steam-engine, and to making the relative peripheries of these gear bear such proportion to each other that a counter-balance upon the balance-wheel will always aid the crank in passing the dead-center.

The single figure in the accompanying drawing making part of this specification is a view, in perspective, of a balance-wheel, crank-shaft, and gearing, combined according to my invention.

A is the crank-shaft, and B the balance-wheel shaft, both journaled in pillows P P'. Crank C, placed outside of the bearing P', operates shaft A. The balance-wheel E, placed outside of pillow P, is operated by shaft B. One spoke of this wheel is slotted longitudinally. A counter-balance, M, is attached to one side of this slotted spoke by a bolt passing through the slot K, said bolt being tightened by a set-screw, N. The counter-balance can thus be set at any point along the slot. On the sides of the counter-balance are flanges for overlapping the edges of the spoke and for preventing said balance from slipping on the spoke. If there be no spokes in the wheel, but a continuous connection between hub and periphery, the slot can be cut in this continuous connection or web, and the shape of the balance be suitably changed to secure it at any point along the slot. Between pillows P and P' a gear-wheel, D, upon shaft A, engages a pinion, H, upon the shaft B. The proportion between the diameters of these two gear-wheels A and B is such that the shaft B revolves twice to one revolution of shaft A.

The balance-wheel is so adjusted upon shaft B that when the crank C is on a dead-center the counter-balance is at that point on the wheel where it exerts its full weight to turn the wheel and overcome the dead-center. As shaft B revolves twice to one revolution of shaft A, obviously the counter-balance, after being in the first instance thus adjusted, will always be in position to exert its full weight and momentum to carry the crank past its dead-center.

If desired, the relative diameters of the gear-wheels D and H might be altered so that D might make four, or six, or eight, &c., revolutions to one of A; or, in other words, so that the numbers of the revolutions of shaft A shall be to those of B in the ratio of one to two, or any multiple of two. Any number of intermediate gear-wheels might be inserted between pinion H and gear-wheel D so long as the number of revolutions of the balance-wheel shaft is to the number of revolutions of the crank-shaft in the ratio aforementioned. Instead of having the cogs of these gears engage each other, it may at times be desirable to separate them and make the operating connection between them consist of an endless chain.

In relation to the adjustment of the counter-balance: When the balance-wheel is revolving rapidly the counter-balance may be fastened near the center, and when it is to revolve slowly said counter-balance is to be fastened near its periphery, so that at all rates of revolution of the balance-wheel the counter-balance shall have the same momentum.

What I claim as new is—

The operating-gear, connected by cogs or endless chain, which communicate motion from the crank-shaft to the balance-wheel shaft when the diameters of said gear are so proportioned relatively that the counter-balance will always aid in carrying the crank past its dead-center, substantially as described.

THEODORE J. McGOWAN.

Witnesses:
C. G. HALE,
PHILIP M. SHUEY.